C. NELSON.
COFFEE MACHINE.
APPLICATION FILED MAY 3, 1907.
1,111,270.
Patented Sept. 22, 1914.
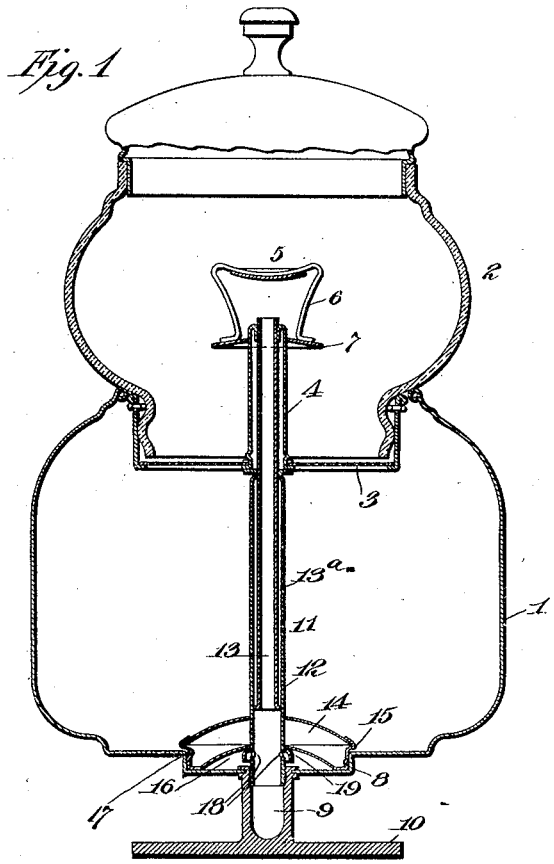
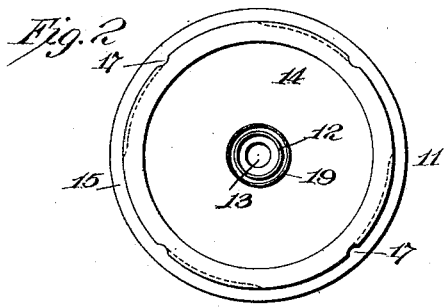
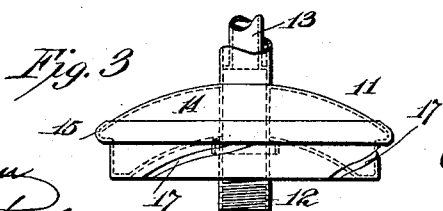
Witnesses:
Jas. F. Coleman
John Fobch
Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & CO., OF NEW YORK, N. Y., A COPARTNERSHIP COMPOSED OF SIGMUND STERNAU AND LIONEL STRASSBURGER.

COFFEE-MACHINE.

1,111,270. Specification of Letters Patent. Patented Sept. 22, 1914.

Application filed May 3, 1907. Serial No. 371,581.

*To all whom it may concern:*

Be it known that I, CHARLES NELSON, a subject of the King of Sweden, residing in the borough of Brooklyn, county of Kings, and State of New York, have invented an Improvement in Coffee-Machines, (Case D,) of which the following is a specification.

This invention relates to an improvement in machines for making infusions of coffee, tea and similar beverages. The invention is not limited to such use but may be employed in connection with such machines for other or analogous purposes.

The objects of the invention are to produce a device which has no moving parts, which is simple, cheap to construct, will not get out of order, and which may be readily and thoroughly cleaned.

Another object is to produce a device which will begin to operate in the minimum of time and exposure to heat, and by means of which an infusion may be induced without bringing all of the water in the receptacle to a boil.

These and other objects will appear from the following drawings, in which—

Figure 1 is a sectional view of a portion of a coffee machine embodying my invention: Fig. 2 is an enlarged view of the bottom of the percolator; Fig. 3 is a side view of the same.

In all of the views like parts are designated by the same reference characters.

In carrying out my invention I provide a receptacle 1 for holding the water before the infusion is made, and the infusion afterward. Above the receptacle is a globe 2. Separating the two is a screen 3 for carrying the pulverized coffee or other material of which the infusion is to be made. The screen 3 has a central opening and supports a tube 4. Upon the tube 4 is a deflector 5, which is supported upon legs 6. Adjacent to the upper end of the tube 4 is a second deflector 7. The legs 6 may be supported upon this second deflector.

The bottom of the receptacle 1 is formed with a recess 8, which is of a less diameter than the diameter of the receptacle. The diameter of the recess is considerable however, for purposes that will be more fully described. Depending from the bottom of the receptacle, in the middle of the recess 8 is a chamber 9 of smaller diameter. The chamber 9 is preferably made integrally with a plate 10, which depends from the bottom of the receptacle. This plate 10 is for the purpose of concentrating the heat from the lamp or other source of heat and convecting it to the chamber 9, and is also for the purpose of keeping the bottom of the receptacle 1 from being directly acted upon by the heat.

The percolator 11 comprises a central tube 12, which communicates with the chamber 9, and extends upward to the screen 3, a flange being formed at its upper end against which the screen rests and is supported. The lower end of the tube 12 makes a tight joint with the upper end of the chamber 9, preferably by being screwed into it. Within the tube 12 is an inner tube 13, its lower end being flared outward to make a tight joint with the inner walls of the tube 12 at some distance from the bottom of the receptacle 1. The tube 13 extends through the tube 4 and ends above the latter. The upper end of the tube 4 is preferably curved inward, as shown, so as to make a close joint with the walls of the tube 13. The upper end of the tube 12 is best curved inward to make a close joint with the inner tube 13. A longitudinal air chamber $13^a$ is thereby formed between the tubes 12 and 13 within the receptacle 1. An air chamber 14 is secured to the tube 12 and rests within the recess 8. The side walls of this chamber are vertical, as shown, but the top and bottom walls are curved. The side walls make a close fit with the side walls of the recess 8, and the edge of the chamber 14 is best made with an overhanging flange 15. The space between the bottom of the recess 8 and the bottom of the chamber 14 constitutes a cavity 16. This cavity 16 communicates with the inside of the receptacle 1 by a labyrinthine passage or passages 17 formed in the outer wall of the air chamber 14, and preferably made on an incline. Where a plurality of passages is used as shown they will be made like a screw-thread on the outer walls of the air chamber 14. These passages serve as a means of communication between the cavity 16 and receptacle 1.

Communication between the cavity 16 and chamber 9 is made by means of an opening or openings 18, formed in that portion of the tube 12 which lies within the chamber 16. Outside of the openings 18 may be a flange 19, such flange may depend from the bottom of the air chamber 14, or it may be carried by the tube 12.

In use the receptacle 1 is partially filled with water or other liquid, and the globe 2 and screen 3 with pulverized coffee or other material of which the infusion is made. The deflector 5 prevents the accidental introduction of the coffee or other material into the central tube 13. Heat is now applied to the plate 10 by a spirit lamp or other suitable means. It will be obvious that the liquid will have previously entered the chamber 9 and cavity 16, and will stand within the tube 13 at the height of the liquid in the receptacle 1, or slightly higher, as caused by capillary action. The liquid in the chamber 9 will be heated and steam generated, which will force the liquid in the inner tube 13, out through the upper end thereof. The equilibrium of liquid within the central inner tube 13 and receptacle 1 will be restored by liquid entering the cavity 16 through the labyrinthine passage 17 and openings 18. Owing to the intricate nature of the passage made by the elements 17 and 18, the liquid will not be forced out through these but will be discharged through the straight inner tube 13.

The liquid discharged from the inner tube 13, will strike against the deflector 5 and be splattered throughout the globe 2 and upon the coffee resting upon the screen 3. A certain amount of the liquid will collect upon the legs 6 and flow down to the deflector 7 and will overflow the edge thereof and drop down upon the coffee immediately under it. A certain amount of the liquid will be splattered against the walls of the globe 2 and will run down such walls.

I find in practice that a coffee machine made in accordance with my invention will operate in a minimum of time and will continue to operate equally well with essence as with pure water. I also find that when the chamber 9 becomes unduly heated that the liquid will continue to be forced up the tube 13. This I attribute to the size of the cavity 16, made possible by the large size of the recess 8, together with the air chambers 12 and 13ª, which keep the contents of the receptacle from becoming unduly heated.

The number of the openings 18 as well as the number of the labyrinthine passages 17 is immaterial. The space between the tubes 13 and 14 constitutes an air chamber which may serve to prevent the heating of the ground coffee by the ascending hot liquid in the tube 13.

The apparatus may be readily cleaned by first removing the globe, screen and percolator and then introducing a brush into the receptacle 1 and chamber 9. The absence of loose parts prevents loss and wear.

The broad feature of the invention which comprises a spiral or labyrinthine passage as a means of communication between the heating chamber and the receptacle, is not claimed herein, but forms the subject matter of another pending application.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. The combination with the receptacle of a coffee machine, the said receptacle having a recess in the bottom, a heating chamber communicating with the recess and an air chamber covering the recess, said air chamber being so arranged as to form a cavity, said cavity being separated from the receptacle by the chamber, of a percolator communicating with the heating chamber, there being a labyrinthine passage between the receptacle and heating chamber, such passage extending around the air chamber and including the cavity.

2. A coffee machine having a receptacle with a recess in the bottom, there being an outside heating chamber in communication therewith, in combination with a percolator connected to the chamber and having an air chamber lying within the recess, with a labyrinthine passage affording communication between the chamber and receptacle, such passage lying within the recess and located on the outside of the air chamber.

3. A percolator for a coffee machine, which comprises a tube, a circular dished air chamber carried by said tube, a second tube within the first and secured thereto at top and bottom, whereby a longitudinal air chamber between the tubes is produced, one of the tubes being perforated and extending below the air chamber, and a flange adjacent to the perforation.

4. A coffee machine having a receptacle, a heating chamber depending below and of less diameter than the receptacle, a percolator communicating with the heating chamber, an air chamber carried by the percolator, there being a cavity formed by the air chamber and the bottom of the receptacle and a passage in the periphery of the air chamber affording communication between the receptacle and the cavity.

5. A coffee machine having a receptacle, a heating chamber depending below and of less diameter than the receptacle, a percolator communicating with the heating chamber, an air chamber carried by the percolator, there being a cavity formed by the air chamber and the bottom of the receptacle and a passage in the periphery of the air chamber affording communication between the receptacle and the cavity, and there being an opening in the percolator allowing communication between the cavity and the heating chamber.

6. A percolator pot, having a main chamber, a recess in the chamber, a heating chamber in communication therewith, a percolator tube having an enlargement adjacent to its lower end and comprising a hollow shell closed at top and bottom to insulate the contents of the pot from such smaller chamber, said shell having a spiral groove formed in its side wall, adapted when the percolator tube is seated in the pot to form with a side wall of the recess, a tortuous passage.

7. A percolator pot comprising a main chamber, a recess in the chamber, a heating chamber, a percolator tube having an enlargement at its lower end comprising a hollow shell, closed at top and bottom to insulate the contents of the pot from the heating chamber, said shell having a groove formed in its side wall adapted when the percolator tube is seated in the pot to form with a side wall of the recess a tortuous passage.

8. In a percolator pot, a main chamber, a recess in the chamber, a heating chamber, a percolator tube having an enlargement at its lower end comprising a hollow insulating shell closed at top and bottom to form a closure for the heating chamber and to insulate the contents of the pot from said chamber, said shell having a continuous groove formed in its side wall adapted when the tube is seated within the pot to form with a side wall of the recess a tortuous passage.

9. In a percolator pot, a main chamber, a recess in the chamber, a heating chamber, a percolator tube having an enlargement at its lower end comprising a hollow insulating shell closed at top and bottom to form a cover for the heating chamber and to insulate the contents of the pot from said heating chamber, said shell having a spiral groove formed in its side wall adapted, when said shell is seated within the recess, to form with a side wall of said pot a spiral passage.

This specification signed and witnessed this 26th day of April, 1907.

CHARLES NELSON.

Witnesses:
LEONARD H. DYER,
JOHN S. LOTSCH.

Copies of this patent may be obtained for five cents each, by addressing the "Commissioner of Patents, Washington, D. C."